UNITED STATES PATENT OFFICE.

WILLIAM AUSTIN, OF LONDON, ENGLAND.

*Letters Patent No. 83,683, dated November 3, 1868.*

IMPROVEMENT IN COMPOSITIONS FOR THE MANUFACTURE OF SAFETY AND OTHER FRICTION-MATCHES.

The Schedule referred to in these Letters Patent and making part of the same.

*To all whom it may concern:*

Be it known that I, WILLIAM AUSTIN, of Greville street, Hatton Garden, London, in the United Kingdom of Great Britain and Ireland, have invented certain "Improvements in the Composition for, and in preparing therewith, Safety and other Friction-Igniting Matches, and their igniting-surfaces; also in metal and other boxes for containing such matches, and for other useful purposes;" and I do hereby declare that the following is a full and exact description thereof; that is to say—

Heretofore, in the manufacture of the compositions for chemically-prepared matches, whether applied to the igniting-surface or match, it has been the practice to mix the chemicals or ingredients with size or other watery preparations. The compositions prepared in this way are liable to be injuriously affected by wet and damp, and, when thus prepared with phosphorus, the composition will not adhere firmly or properly to any metal, glass, stone, or earthenware, or other similar hard or polished surface, if applied directly thereto; hence, boxes made of any such materials, to contain and ignite safety-matches, have hitherto had to be fitted with a paper or card, separately prepared with the phosphoretic composition.

Now, the object of my invention is, first, to render the friction-igniting composition wet and damp-proof; secondly, to make such composition, when prepared with phosphorus, for igniting safety or other matches, capable of being applied directly to and adhering firmly upon the natural surface of such boxes or materials without any previous preparation of such surfaces therefor; thirdly, to make the chemicals for igniting safety-matches adhere firmly to such metallic and other surfaces, when such chemicals are mixed in the ordinary way; fourthly, to cause, by the aid of other ingredients, the chemicals for igniting safety-matches, when applied in a dry state, to adhere firmly to the metallic and other surfaces above mentioned.

In carrying out the first part of my invention or improvement first above stated, I mix or combine the friction-igniting surface and match-chemicals or ingredients with japan or other similar varnish or compound, or matter possessing qualities similar to that of varnish, or analogous thereto, or possessing resinous, oleaginous, or anti-hydro properties, instead of mixing the said chemicals or ingredients with size or other watery preparations, as has been the practice hitherto.

The chemicals which I use for the safety-match igniting-surfaces are, for every two pounds of varnish, amorphous phosphorus, three pounds; spirits of tar, three-quarters of a pound; black sulphuret of antimony, three pounds; red ochre, one pound; and emery, finely-granulated glass, or other similar material, one pound.

It will be obvious to every chemist conversant with these substances, that other similar substances, and proportions slightly varied, may be employed for the purpose first stated without departing from the principle of my invention.

In carrying out the second part of my invention, I apply the anti-hydro composition, mixed with the chemicals or ingredients, directly to or upon the metal or other material before mentioned, by painting the same thereon, or dipping the surface therein; or by first applying the anti-hydro matter or varnish to or upon the material, and then dipping the surface thus prepared in the chemical mixture or igniting-ingredients; or by applying the varnish first, and then adding the other ingredients or chemicals separately, in a dry state, while the varnish is liquid. In each case, the anti-hydro matter or varnish acts as the medium for causing the chemicals to adhere firmly to the surface. The other parts of the box or match-container, with one or more surfaces thus prepared, may then be lacquered, and the composition and lacquer baked or dried thereon simultaneously in an oven or drying-stove, or by applying heat thereto in any suitable way.

In carrying out the third part of my invention or improvement, in causing the phosphoretic composition, when mixed in the ordinary way, to adhere firmly to the metallic and other surfaces herein mentioned, I first prepare such surfaces by a priming of the anti-hydro compound or matter, or varnish and grit only, and when this priming has dried, or partially dried, paint the phosphoretic composition thereon.

Lastly, I prepare the metallic surfaces with the priming above mentioned, and, before it has hardened, apply the chemicals and phosphorus thereto in a dry state, either mixed, partially mixed, or separately.

I have found that by mixing the friction-igniting surface chemicals for safety-matches, or matches where the phosphorus is applied to the igniting-surface of the box, instead of to the end of the match, with the ordinary japan varish of commerce, the mixture will possess the required anti-hydro properties, and that a heat of about 250° Fahrenheit, more or less, will generally be sufficient for drying the same rapidly. The drying-process may be effected by stoving, baking, or heating the surface, or in any other way which may be found to answer in practice.

The anti-hydro composition is suitable for being applied to the surface of wood, paper, and other boxes, match-containers, or match-igniting surfaces, and the anti-hydro ingredient may be used with chemicals in preparing any composition for dipping matches, by which applications, respectively, the boxes, surfaces, and matches will be improved, and become less liable to be injuriously affected by wet or damp; and, in consequence of the greater body or toughness imparted to the composition, the friction-surfaces will be more durable when in use, and the composition upon the matches less liable to rub off without igniting the match.

I further improve the boxes, when made of wood, paper, or other similar substances, for containing and igniting matches, by forming the same with flanged metal ends or lids, pressed to the required shape in a die, for being coated with igniting-composition, and for protecting the matches from injury when placed upon a damp surface.

For dispensing with the use of solder in the manufacture of metal boxes for containing and igniting matches, and for other useful purposes, still using ends formed as last above mentioned, I make the bodies of blank pieces of tin or metal, of a perfect rectangular shape, with four sides only, and turn down (⌒ thus) the two opposite ends or sides, so as to form an interlapping joint (⌒⌒ thus) when brought together, and beaten up on a mandrel, or drawn through a die of the required shape.

I hereby declare that what I more particularly claim, and desire to secure by the Letters Patent, is—

1. The manufacture of match-igniting chemicals and ingredients with anti-hydro matter, so as to render the same, and the igniting-surfaces and matches prepared therewith, wet and damp-proof.

2. The manufacture of friction-igniting chemicals and ingredients for safety-matches and their igniting-surfaces, with the anti-hydro matter or compound herein mentioned, and applying the same directly to or upon the natural surface of the material of boxes, match-containers, or match-igniters, of metal, china, stone, or earthenware, or other similar materials.

3. The manufacture of other match-igniting chemicals, with the anti-hydro matter or compound herein mentioned, and applying the same to matches.

WILLIAM AUSTIN.

Witnesses:
WILLIAM BULL, *C. E.*,
   1 *Quality Court, Chancery Lane, London.*
WILLIAM COOK, *Sutton, Surrey.*